US011922001B2

(12) United States Patent
Brown et al.

(10) Patent No.: US 11,922,001 B2
(45) Date of Patent: *Mar. 5, 2024

(54) COPYING USER INTERFACE ARTIFACTS WITH DYNAMIC LEVELS OF DETAIL AND SHORTCUT KEYS

(71) Applicant: MICROSOFT TECHNOLOGY LICENSING, LLC, Redmond, WA (US)

(72) Inventors: Jared Brown, Seattle, WA (US); John Thomas Kimbell, Kirkland, WA (US); Patrick Evan Little, Redmond, WA (US); Marianna Levant, Seattle, WA (US); Rory Akira Malcolm Fairweather, Seattle, WA (US); Lisa Marie Wright, Coupeville, WA (US); Gurpreet Virdi, Redmond, WA (US); Grigoriy V Lyukshin, Renton, WA (US); David Chege Gitau, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/182,605

(22) Filed: Mar. 13, 2023

(65) Prior Publication Data

US 2023/0214104 A1 Jul. 6, 2023

Related U.S. Application Data

(63) Continuation of application No. 17/470,768, filed on Sep. 9, 2021, now Pat. No. 11,644,959, which is a
(Continued)

(51) Int. Cl.
*G06F 40/166* (2020.01)
*G06F 3/0481* (2022.01)
(Continued)

(52) U.S. Cl.
CPC ........ *G06F 3/04845* (2013.01); *G06F 3/0481* (2013.01); *G06F 3/0482* (2013.01);
(Continued)

(58) Field of Classification Search
CPC .. G06F 3/04845; G06F 3/0481; G06F 3/0482; G06F 3/04842; G06F 3/0489;
(Continued)

(56) References Cited

U.S. PATENT DOCUMENTS

2008/0109850 A1* 5/2008 Gibbon .................. H04H 60/65
348/E7.071
2011/0126092 A1* 5/2011 Harris .................... G06F 40/174
715/256

(Continued)

OTHER PUBLICATIONS

"Extended European Search Report in European Patent Application No. 23158649.6", dated Apr. 11, 2023, 16 Pages.

*Primary Examiner* — Hien L Duong

(57) ABSTRACT

A method of operating a device, which includes providing a user interface with a display artifact; in response to an indication a user selected to copy the display artifact, storing multiple levels of detail of the display artifact; allowing the user to paste a selected level of detail by steps of: in response to an indication a user selected an input field and a paste command, displaying a plurality of paste options for pasting the display artifact into the input field, wherein the plurality of paste options each have a unique level of detail for representing the display artifact; allowing the user to select from the plurality of paste options; and in response to an indication a user selected a paste option from the plurality of
(Continued)

paste options, pasting the display artifact with a level of detail associated with the selected paste option into the input filed.

20 Claims, 13 Drawing Sheets

Related U.S. Application Data continuation of application No. 16/916,666, filed on Jun. 30, 2020, now Pat. No. 11,132,115.

(51) Int. Cl.
| | |
|---|---|
| *G06F 3/0482* | (2013.01) |
| *G06F 3/04842* | (2022.01) |
| *G06F 3/04845* | (2022.01) |
| *G06F 3/0489* | (2022.01) |
| *G06F 9/54* | (2006.01) |
| *G06F 16/16* | (2019.01) |

(52) U.S. Cl.
CPC ........ *G06F 3/04842* (2013.01); *G06F 3/0489* (2013.01); *G06F 9/543* (2013.01); *G06F 16/168* (2019.01)

(58) Field of Classification Search
CPC ........ G06F 9/543; G06F 16/168; G06F 9/451; G06F 40/106; G06F 40/166
See application file for complete search history.

(56) References Cited

U.S. PATENT DOCUMENTS

| | | | | |
|---|---|---|---|---|
| 2013/0060711 | A1* | 3/2013 | Dachenhaus | G06Q 10/1053 705/321 |
| 2015/0143211 | A1* | 5/2015 | Kaufthal | G06F 40/166 715/205 |
| 2015/0154156 | A1* | 6/2015 | Meyers, Jr. | G06F 40/134 715/205 |
| 2017/0220536 | A1* | 8/2017 | Chiba | G06F 40/232 |
| 2018/0129396 | A1* | 5/2018 | Buckley | G06F 3/04895 |

* cited by examiner

COPYING USER INTERFACE ARTIFACTS WITH DYNAMIC LEVELS OF DETAIL AND SHORTCUT KEYS

CROSS-REFERENCE TO RELATED APPLICATIONS

This application is a continuation of U.S. patent application Ser. No. 17/470,768 filed Sep. 9, 2021, which is a continuation of U.S. patent application Ser. No. 16/916,666 filed Jun. 30, 2020, now Issued U.S. Pat. No. 11,132,115, entitled "Copying User Interface Artifacts with Dynamic Levels of Detail and Shortcut Keys," which is incorporated herein by reference in their entireties. To the extent appropriate a claim of priority is made to all applications.

BACKGROUND

User interfaces include a variety of different artifacts that can be manipulated by a computer user including icons, text, buttons, graphics, photos, and uniform resource locators. A uniform resource locator (URL) specifies a location of an internet resource. It is sometimes called a web address. A URL can be used by web browsers or other software tools to find and retrieve resources such as web pages on the internet. The URL is often inserted into an address bar on a web browser display. A URL may be relatively simple; or it can be extremely complex. The more complex URLs are not human readable and are cumbersome for users to work with. Some software tools use various formats to represent a URL to free the user from dealing with complex URLs. When URLs are copied and pasted by a user, the URLs and information related to the URL may be presented to the user in different formats with different levels of detail to make it less cumbersome for the user and provide more information. Users may require using these different formats with varying levels of detail for the URL depending on how the URL is going to be used.

A user using a web browser often also requires copying a URL or other interface artifact. Copying an artifact such as a URL typically includes a copy step, followed by a paste step. For example, in the copy step, the user highlights a URL and actuates a copy command or key to place a copy of the URL in memory. The paste step includes the user selecting a destination and pasting the URL into the destination by actuating a paste command. A shortcut key can be used to actuate the copy or paste commands in leu of selecting a menu command. Some shortcut keys have become common across multiple tools and vendors. These common shortcut keys are referenced herein as habitual shortcut keys, where their use becomes a habitual response for a user.

SUMMARY

A device is disclosed, which includes a processor and a memory in communication with the processor. The memory includes executable instructions that, when executed by the processor, cause the processor to control the device to perform functions of providing a user interface with a display artifact; in response to receiving an indication a user selected to copy the display artifact, storing multiple levels of detail of the display artifact; allowing the user to paste a selected level of detail for the display artifact by steps of: in response to receiving an indication the user selected an input field and a paste command, displaying a plurality of paste options for pasting the display artifact into the input field, wherein the plurality of paste options each have a unique level of detail for representing the display artifact; and allowing the user to select from the plurality of paste options; and in response to receiving an indication the user selected a paste option from the plurality of paste options, pasting the display artifact with a level of detail associated with the selected paste option into the input filed.

In another implementation, a method of operating a device is disclosed, which includes providing a user interface with a display artifact; in response to receiving an indication a user selected to copy the display artifact, storing multiple levels of detail of the display artifact; allowing the user to paste a selected level of detail for the display artifact by the steps of: in response to receiving an indication a user selected an input field and a paste command, displaying a plurality of paste options for pasting the display artifact into the input field, wherein the plurality of paste options each have a unique level of detail for representing the display artifact; allowing the user to select from the plurality of paste options; and in response to receiving an indication a user selected a paste option from the plurality of paste options, pasting the display artifact with a level of detail associated with the selected paste option into the input filed.

In another implementation, a non-transitory computer readable medium is disclosed on which are stored instructions that, when executed by a computer processor, cause a device to: provide a user interface with a display artifact; in response to receiving an indication a user selected to copy the display artifact, store multiple levels of detail of the display artifact; allow the user to paste a selected level of detail for the display artifact by the steps of: in response to receiving an indication a user selected an input field and a paste command, display a plurality of paste options for pasting the display artifact into the input field, wherein the plurality of paste options each have a unique level of detail for representing the display artifact; allow the user to select from the plurality of paste options; and in response to receiving an indication a user selected a paste option from the plurality of paste options, past the display artifact with a level of detail associated with the selected paste option into the input filed.

In another implementation, a method of operating a device is disclosed, which includes providing a user interface with a display artifact; allowing a user to perform a function with the display artifact by the steps of: setting a previously habituated shortcut key value to perform a function with a chosen default type of the function; presenting the previously habituated shortcut key value as the shortcut key for a function format matching the chosen default type of the function in a sub-function context menu; and presenting other, non-habituated shortcut key values for other function format types in the sub-function context menu.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

This description is directed to copying user interface artifacts with multiple levels of detail and using shortcut keys. Users of a graphical user interface are often required to copy and paste display artifacts that include various levels of detail. For example, URLs are often complex and cumbersome for users to work with. Some software tools use various formats to represent a URL to free the user from dealing with complex URLs. The tools may copy and paste a higher level of detail depending on the destination being able to accept the additional detail. However, common tools do not allow the user to observe and control the level of detail.

To improve the user experience and alleviate the above problem, the disclosure and claims herein are directed to a system providing a user interface which allows the user to copy and paste display artifacts with multiple levels of detail. Further, the user may be provided with static preview representation or a dynamically generated live preview for each level of detail so the user can see exactly what the level of detail contains. The user may be provided with an opportunity to set a default level of detail. Further, the user may optionally use a habitual shortcut key that that changes function based on the selected default level of detail.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
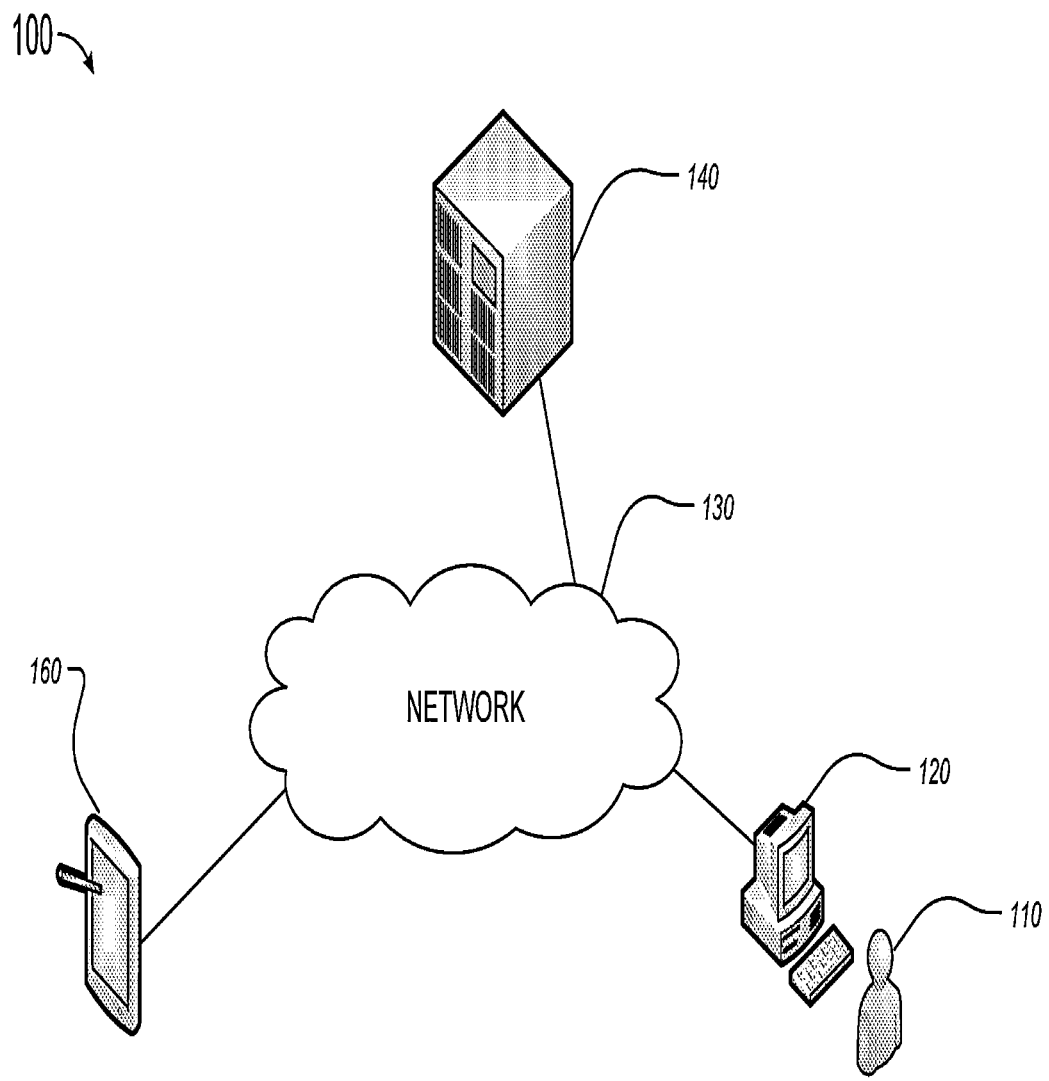
FIG. 1 illustrates a system where a user interacts with a graphical user interface on a computer which includes aspects of the claimed invention.

FIG. 1 illustrates an example system 100, upon which aspects of this disclosure may be implemented. The system 100 may include a user 110 operating a user device 120 which is connected through a network 130 to one or more other devices. The user may access and interact with internet resources on a server 140 connected to the network 130. The network 130 may be a wired or wireless network or a combination of wired and wireless networks including the internet. In one implementation, the one or more steps may be done by the device 120 and/or device 160 connected locally or remotely to the network 130. In another configurations, some of the steps may be performed by the server 140, and some may be performed by the device 120 and/or device 160. For example, the device 120 may include a display with a graphical user interface such as a web browser. The web browser allows the user 110 to access internet webpages located on various remote servers over the internet such as server 140 using a uniform resource location placed into an address bar on the web browser. The device 120 further allows the user 110 to copy and paste a display artifact with multiple levels of detail as described herein. Similarly, device 160 may include a web browser to access internet webpages located on server 140.

Figure 2A:
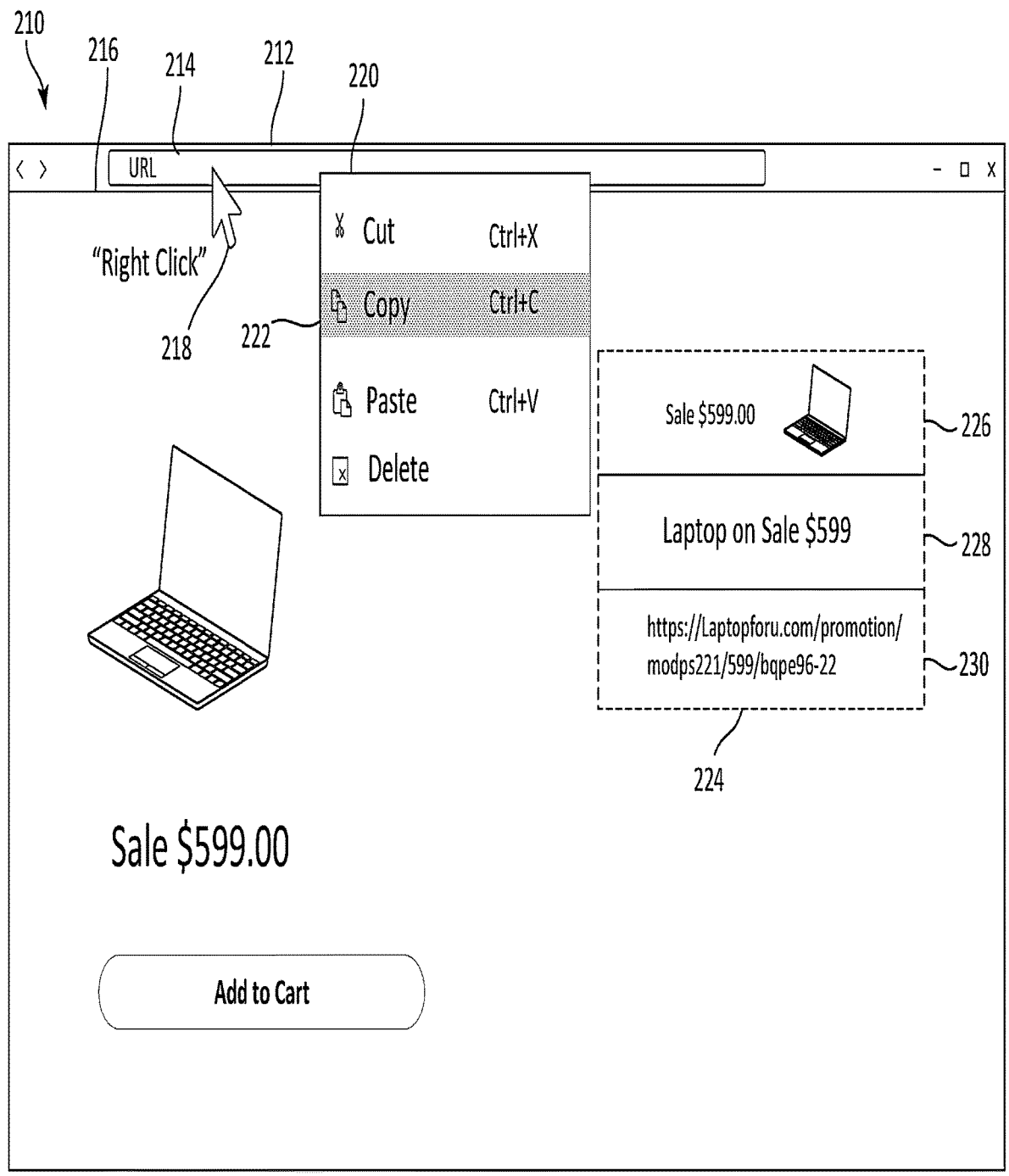
FIG. 2A illustrates a display of a computing device with an implementation for copying user interface artifacts with multiple levels of detail.

FIG. 2A illustrates an implementation of a display 210 of a computing device such as user device 120 in FIG. 1. In different implementations, the display 210 may present various application graphics such as graphical user interface (GUI) with various buttons, display boxes, graphics and other display artifacts. In the illustrate example, the display 210 represents a view of a GUI 212 for a web browser. The web browser allows a user to access internet webpages located on various remote servers over the internet such as server 140 in FIG. 1. The GUI 212 of the web browser on the display 210 includes an address bar 214 and a browser display window 216. The address bar 214 typically displays the URL for the currently displayed web page on the browser display window 216. The address bar 214 can typically also be used as an input of a URL to retrieve another webpage. A user may input a desired URL into the address bar 214 or copy the URL displayed in the address bar to be used elsewhere.

FIG. 2A further illustrates allowing the user to copy a display artifact with multiple levels of detail. In this example, the user has moved the pointer 218 over the display field of the address bar 214 containing a URL. The operation of selecting a display artifact may be accomplished by "right clicking" a mouse or other device that controls the location of the pointer 218. In response to the user selecting the address bar 214, the pop-up menu 220 is displayed to allow the user to select an action for the user interface to take on the selected display artifact (URL) in the location indicated by the pointer. In this example, the user selects the copy option 222 in the pop-up menu 220. In this example, the GUI 212 implemented on the user device stores multiple levels of detail 224 for the display artifact indicated by the location of the pointer 218 at the time the user initiated the selection. In this example, the levels of detail 224 stored for the selected display artifact, a URL, include web preview 226, link 228 and plain text 230. Data for the levels of detail 224 is stored in memory such that it can be accessed and used when the user chooses to paste the display artifact in another location in the same or different application on the user device 120. Additional details for storing the multiple levels of detail are described below with reference to FIG. 6. As used herein, the term pointer may include a cursor or other GUI artifact controlled by a mouse, a keyboard, or a touch pad. Or the pointer may be implemented as a contact point on a touch screen. Alternatively, the pointer may be implemented by other non-touch means such as by gaze or voice in which a user interacts with a computer user interface on a display, including by not limited to, two dimensional displays, three dimensional displays as well as virtual reality and mixed reality displays.

Figure 2B:
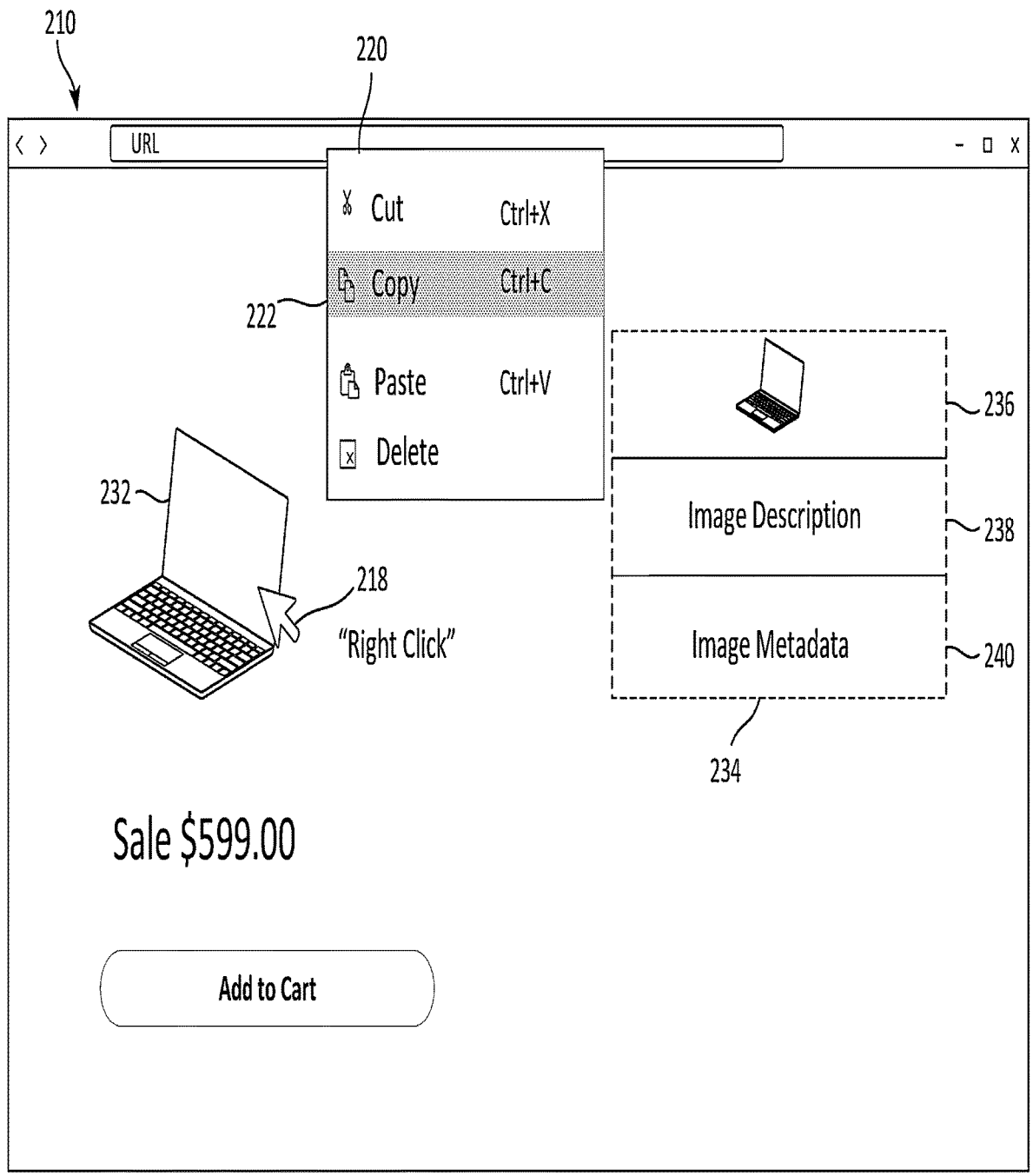
FIG. 2B illustrates another example of a display of a computing device with an implementation for copying user interface artifacts with multiple levels of detail.

FIG. 2B illustrates another implementation of allowing the user to copy a display artifact with multiple levels of detail. In this example, the user has moved the pointer 218 over the image 232 of a laptop on the display 210. The operation of selecting a display artifact may be accomplished by "right clicking" as described above. In response to the user selecting the image 232, the pop-up menu 220 is displayed to allow the user to select an action for the user interface to take on the selected display artifact (image of a laptop). In this example, the user selects the copy option 222 in the pop-up menu 220. In this example, the GUI 212 implemented on the user device stores multiple levels of detail 234 for the display artifact of the laptop image 232. In this example, the levels of detail 224 stored for the selected display artifact, an image, include the image 236, image description 238 and image metatdata for image 240. The image 236 may include a grayscale version of a color image or a color version of a grayscale image. The image description 328 may be an artificial intelligence generated description of what the image represents or contains. The image metadata 240 may include the size, resolution, location, date, or other image information. Data for the levels of detail 234 is stored in memory as described above for use later in a paste step.

Figure 3A:
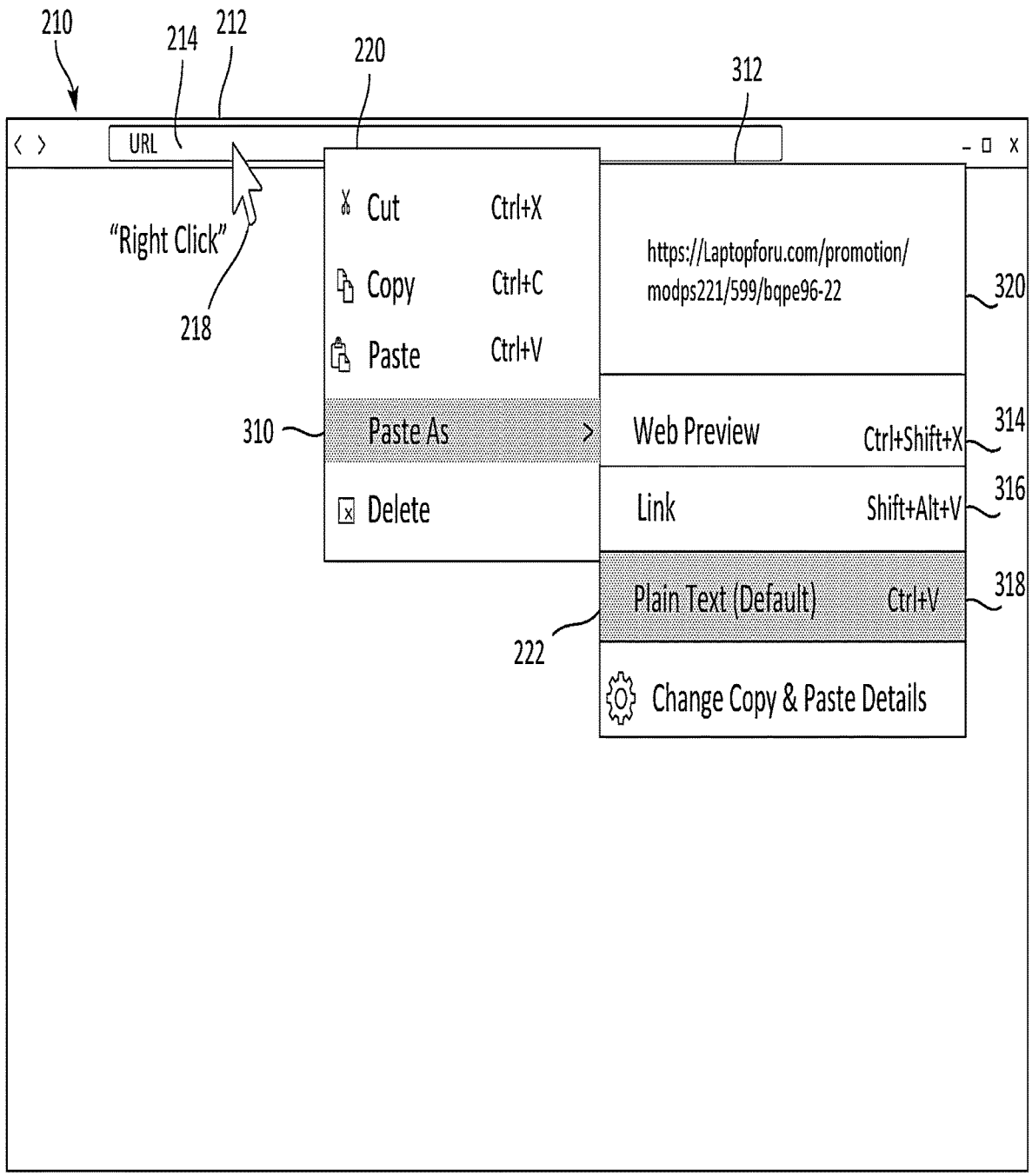
FIG. 3A illustrates an example of a display of a computing device with an implementation for copying user interface artifacts such as a URL with multiple levels of detail.

FIG. 3A illustrates the GUI 212 allowing the user to paste a display artifact with multiple levels of detail. In this example, the user has moved the pointer 218 over the address bar 214 and selects to paste a previously copied URL. The operation of selecting to paste a display artifact such as the URL may be accomplished by "right clicking" a mouse or other device that controls the location of the pointer 218. In response to the above action, the pop-up menu 220 is displayed to allow the user to select an action for the user interface to take on the selected display artifact (URL) in the location indicated by the pointer. In this example, the user selects the "paste as" option 310 in the pop-up menu 220. In response to selecting the "paste as" option 310, the GUI 212 displays a paste options menu 312 with options for pasting multiple levels of detail at the location of the pointer 218. In this example, the levels of detail displayed in the paste options menu 312 for the selected field, in this case a URL, include a web preview option 314, a link option 316 and a plain text option 318. Data for the three levels of detail was previously stored in memory as described above. In this case, the input field is the address bar 214 which will only accept a plain text level of detail. Thus, the plain text option 318 is selectable by the user while the link option 316 and web preview option 314 are not available and are shown to the user in "greyed out" text to indicate they are not available. When the user selects the plain text option 318, the plain text level of detail for the URL will be pasted into the address bar 214. In this implementation, the paste options menu 220 also includes a preview display 320 that shows the user a dynamic live preview of the currently selected level of detail. In this case the currently selected level of detail is plain text as indicated by the plain text option 318 shown as a shaded or highlighted menu option.

Figure 3B:
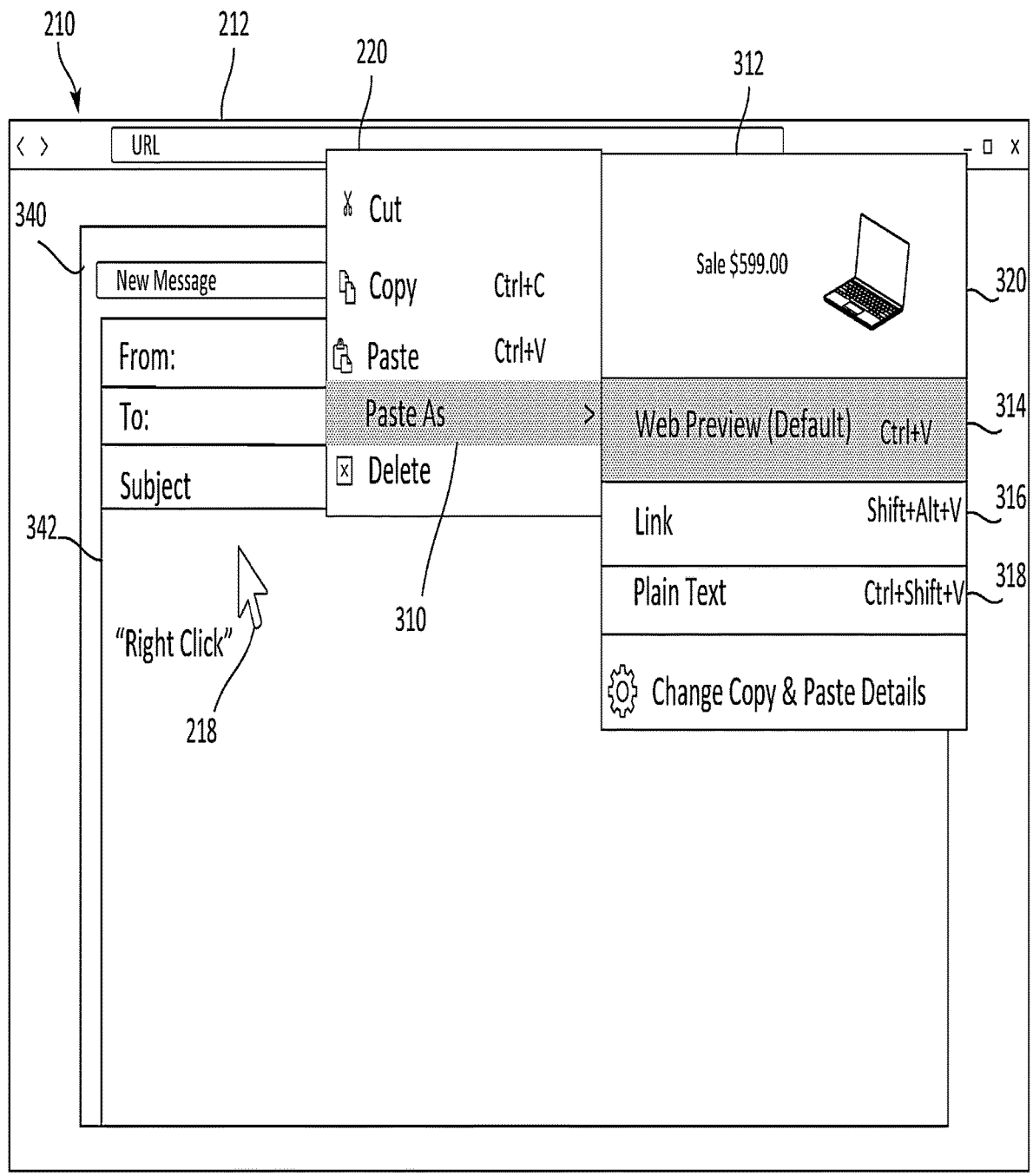
FIG. 3B illustrates another example of a display of a computing device with an implementation for copying user interface artifacts such as a URL with multiple levels of detail.

FIG. 3B illustrates another example of the GUI 212 allowing the user to paste a display artifact with multiple levels of detail. In this example, the GUI 212 includes a window of a messenger application 340 with a new message block 342. In this example, the user has moved the pointer 218 over the new message block 342 to paste a previously copied display artifact, which in this example is a URL. The operation of selecting to paste a display artifact such as the URL may be accomplished as described above. In response to selecting to paste a display artifact, the pop-up menu 220 is displayed to allow the user to select an action for the user interface to take on the selected display artifact (URL) in the location indicated by the pointer. In this example, the user selects the "paste as" option 310 in the pop-up menu 220. In response to selecting the "paste as" option 310, the GUI 212 displays a paste options menu 312 with options for pasting multiple levels of detail at the location of the pointer 218. In this example, the levels of detail displayed in the paste options menu 312 for the selected field, a URL, include a web preview option 314, link option 316 and plain text option 318. Data for the three levels of detail was previously stored in memory as described above. The selected input field in this example will accept all levels of detail. Thus, all three options 314, 316, 318 are available to the user and no options are displayed in "greyed out" text to indicate they are not available. When the user selects the web preview option 318, the web preview level of detail for the URL will be pasted into the selected field. The paste preview display 320 shows the user a dynamic live preview of the currently selected level of detail. In this case the currently selected level of detail is the web preview option as indicated by the highlighted web preview option.

Figure 3C:
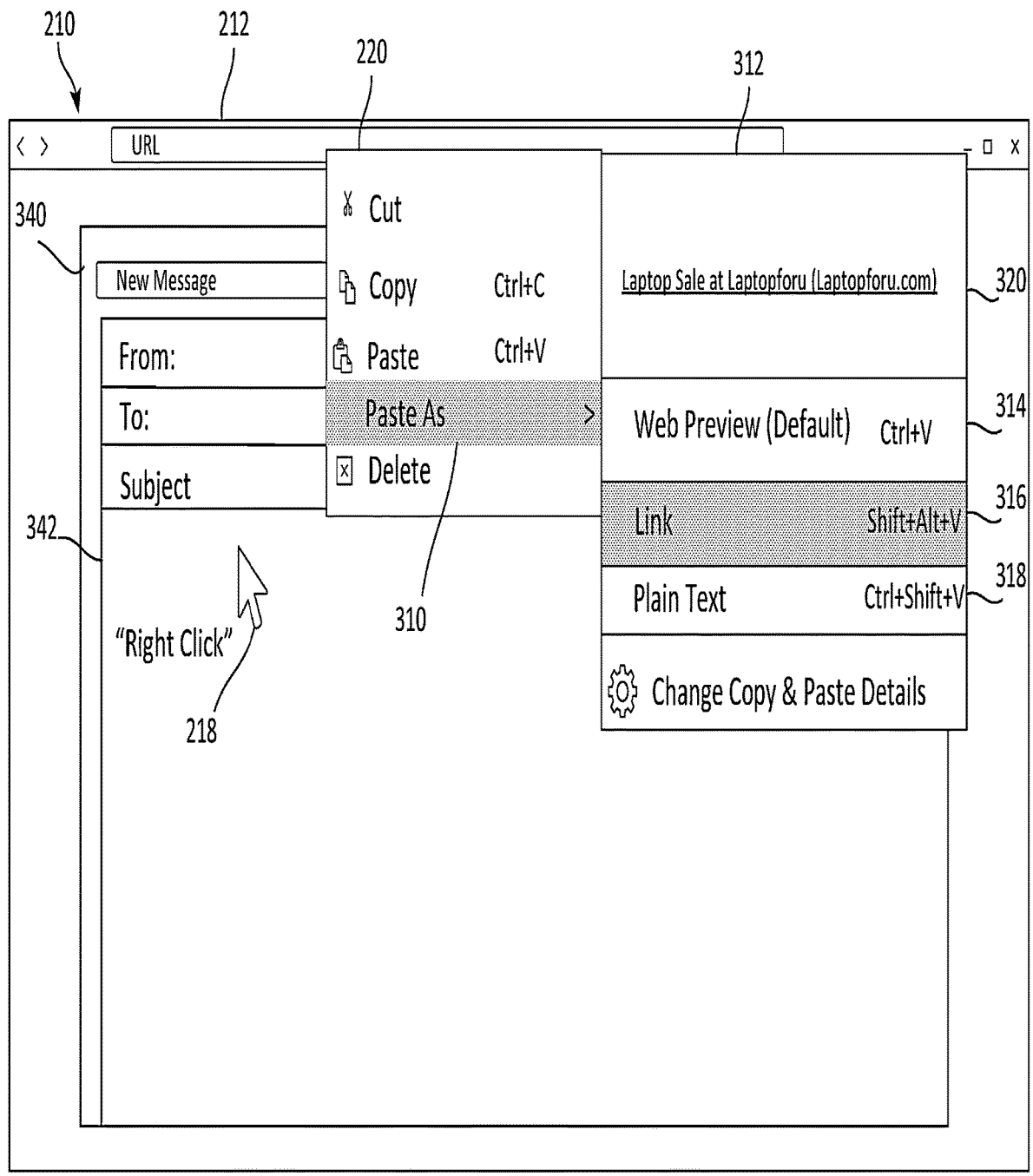
FIG. 3C illustrates another example of a display of a computing device with an implementation for copying user interface artifacts such as a URL with multiple levels of detail

FIG. 3C illustrates another example of the GUI 212 allowing the user to paste a display artifact with multiple levels of detail. This example is similar to FIG. 3B with a window of a messenger application 340 with a new message block 342. The user has moved the pointer 218 over the new message block 342 to paste the previously copied URL as described above. In response to selecting to paste a display artifact, the pop-up menu 220 is displayed to allow the user to select an action for the user interface to take on the selected display artifact (URL) in the location indicated by the pointer. In this example, the user selects the "paste as" option 310 in the pop-up menu 220. In response to selecting the "paste as" option 310, the GUI 212 displays a paste options menu 312 with options for pasting multiple levels of detail at the location of the pointer 218. In this example, the levels of detail displayed in the paste options menu 312 for the selected field, a URL, include a web preview option 314, link option 316 and plain text option 318. Data for the three levels of detail was previously stored in memory as described above. The selected input field in this example will accept all levels of detail. Thus, all three options 314, 316, 318 are available to the user and no options are displayed in "greyed out" text to indicate they are not available. When the user selects the Link option 316, the Link level of detail for the URL will be pasted into the selected field. The paste preview display 320 shows the user a dynamic live preview of the Link option which is the currently selected level of detail as indicated by the highlighted link option 316. The preview display 320 shows the user the live preview of the Link option 316 which is a link for the URL chosen earlier by the user.

Figure 3D:
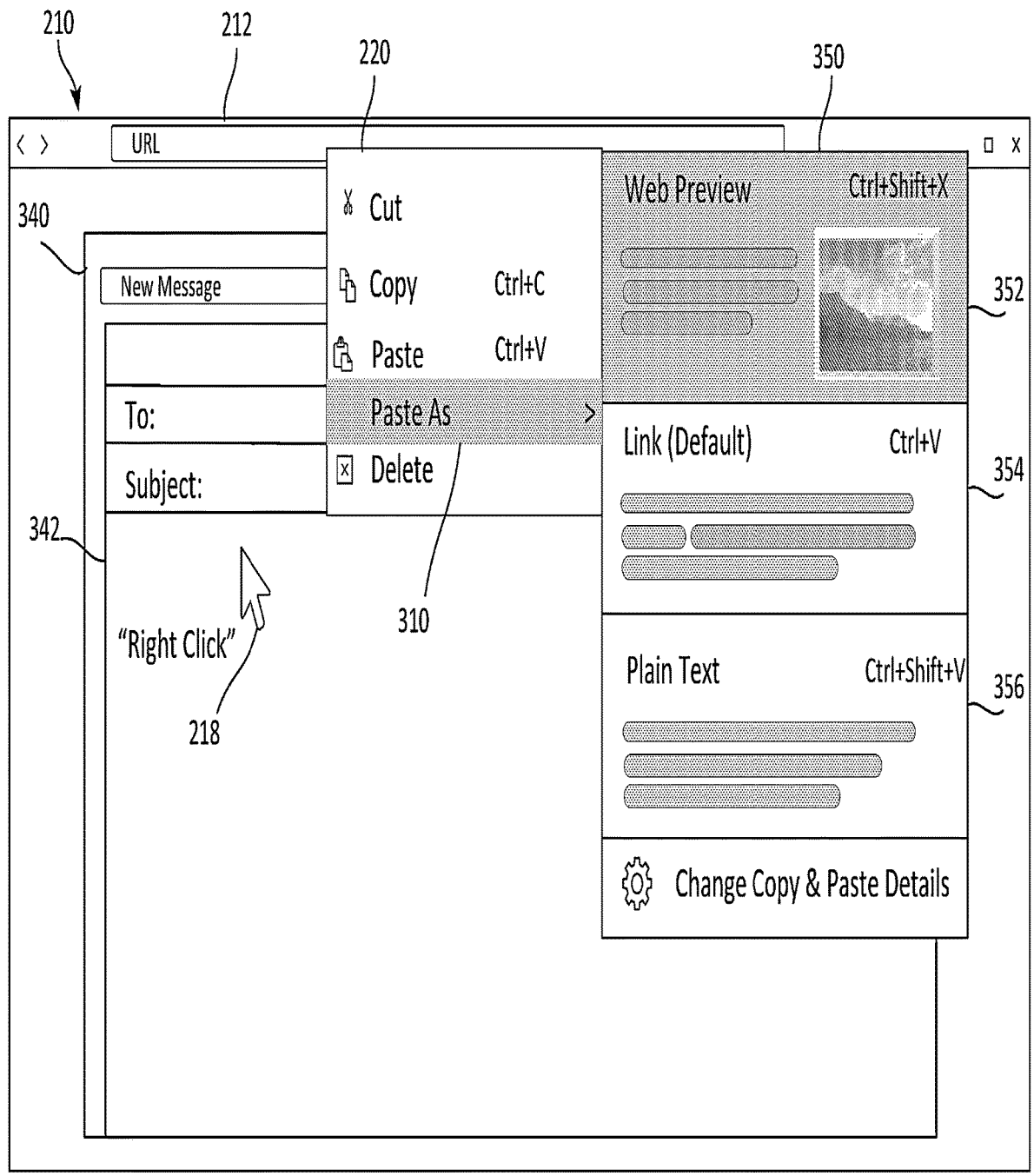
FIG. 3D illustrates another example of a display of a computing device with an implementation for copying user interface artifacts such as a URL with multiple levels of detail

FIG. 3D illustrates another example of the GUI 212 allowing the user to paste a display artifact with multiple levels of detail. This example is similar to the example illustrated in FIG. 3B, except this example includes a static preview representation of the selected level of detail. As in the prior example, the user has moved the pointer 218 over the new message block 342 to paste a previously copied display artifact, which is a URL. The operation of selecting to paste a display artifact such as the URL may be accomplished as described above. In response to selecting to paste a display artifact, the pop-up menu 220 is displayed to allow the user to select an action for the user interface to take on the selected display artifact (URL) in the location indicated by the pointer. In this example, the user selects the "paste as" option 310 in the pop-up menu 220. In response to selecting the "paste as" option 310, the GUI 212 displays a paste options menu 350 with options for pasting multiple levels of detail at the location of the pointer 218. In this example, the paste options are each shown with graphics to indicate a static preview representation for each level of detail. The graphics for the static representation for the level of detail are made to reflect what that level of detail looks like in a general case. The levels of detail displayed in the paste options menu 350 for the selected field include a web preview option 352, a link option 354 and a plain text option 356. Data for the three levels of detail was previously stored in memory as described above. The selected input field in this example will accept all levels of detail. Thus, all three options are available to the user and no options are displayed in "greyed out" text to indicate they are not available. When the user selects the web preview option 352, the web preview level of detail for the URL will be pasted into the selected field. The paste options menu 350 shows the user a static preview representation of each level of detail including the currently selected level of detail. In this case the currently selected level of detail is the web preview option 352 as indicated by the highlighted web preview option 352.

Figure 4:
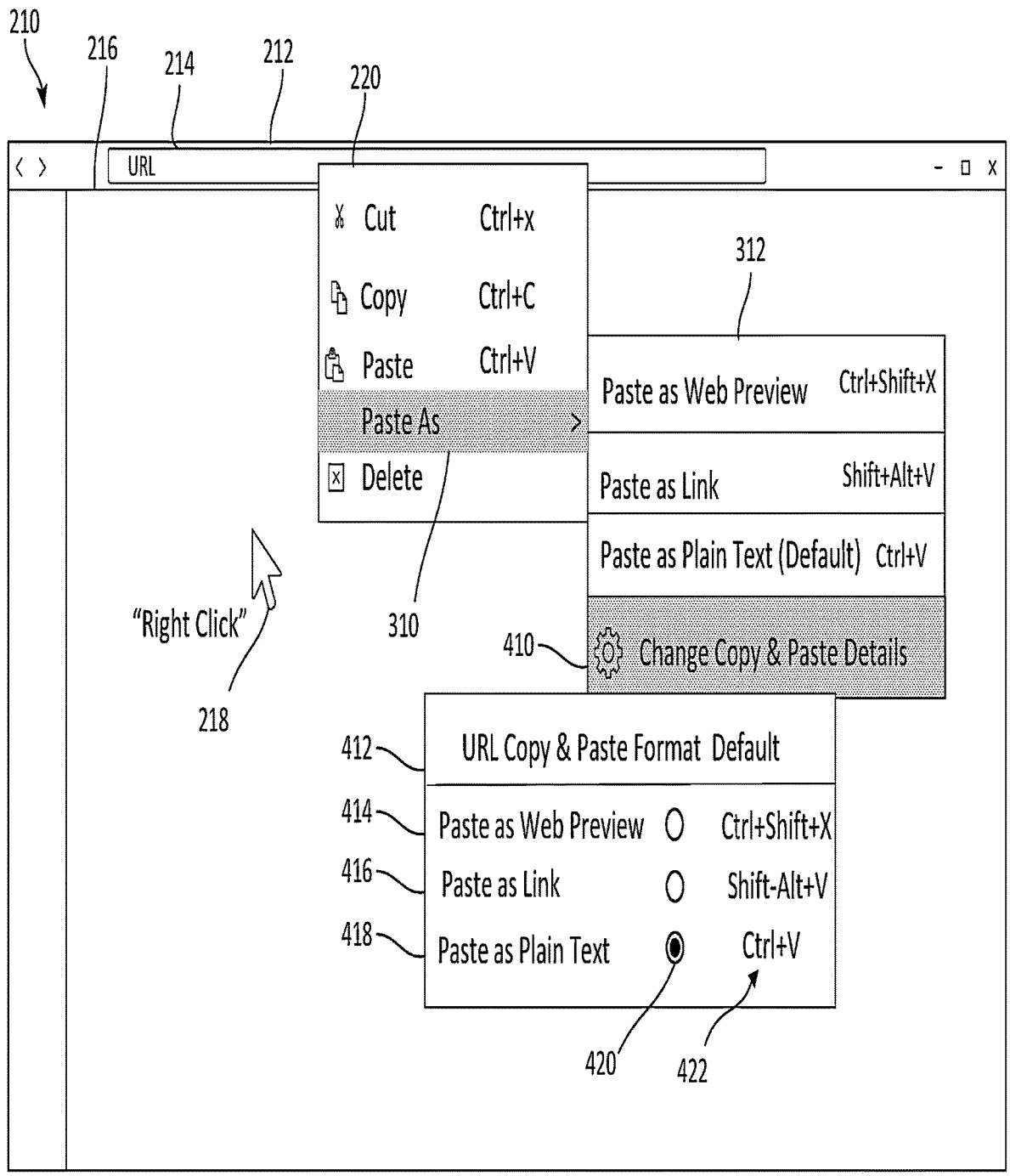
FIG. 4 illustrates an implementation which allows the user to change the copy and paste format default.

FIG. 4 illustrates the GUI 212 allowing the user to select a default level of detail and set the corresponding habituated shortcut key. In this example, the user has moved the pointer 218 over the display window 216 and selects to paste a previously copied URL by "right clicking" a mouse or other device that controls the location of the pointer 218. In response the pop-up menu 220 is displayed to allow the user to select an action for the user interface to take on the selected display artifact (URL) in the location indicated by the pointer. In this example, the user selects the paste as option 310 in the pop-up menu 220. In response to selecting the paste as option 310, the GUI 212 displays a paste options menu 312 with options for pasting multiple levels of detail. The user is then able to select the Change Copy & Paste Details option 410. In this example implementation, selecting the Change Copy & Paste Details option 410 brings up a selection window 412. The selection window 412 allows the user to select a URL Copy & Paste Format Default.

Again referring to FIG. 4, in the selection window 412, the user is presented with three the levels of detail, namely, Paste as Web Preview 414, Paste as Link 416 and Paste as Plain Text 418. The selection window 412 includes a radio button or option button associated with each level of detail. The user is allowed to select one of the radio buttons to choose one of the three mutually exclusive options. For example, selecting the radio button 420 sets Paste as Plain Text 418 as the default level of detail. When the user makes the selection, the radio button 420 is turned dark and any previous selection of the other levels of default is cleared. While this example shows the selection window 412 for selecting the default as a pop up window, it is understood that the function of this window could also be incorporated into a separate screen or other user input area. For example, in response to the user is selecting the Change Copy & Paste Details option 410, the GUI 212 could take the user to a settings screen with the option for selecting the default level of detail using any suitable input button. The default level of detail set by a user in the browser may have an impact to the level of detail available for use outside of the browser. For example, when pasting a previously copied display artifact, only the default level of detail may be available to the destination application. Thus, the default choice made within the browser may control the level of detail used outside of the browser depending on what is stored and the capability of the application used to paste the copied display artifact.

FIG. 4 further illustrates an implementation that supports a relationship between the selected default level of detail and habitual shortcut keys. As introduced above, some shortcut keys have become common across multiple tools and vendors. These common shortcut keys are called habitual shortcut keys, or previously habituated shortcut keys, where their use becomes a habitual response for a user. One such habitual key is the "Ctrl+V" paste key. Where "Ctrl+V" means to simultaneously press the "control" and "V" keys on the keyboard. This shortcut key is commonly used to paste something recently copied by a user. In the illustrated implementation, selection of the radio button 420 changes the default level of detail to Paste as Plain Text 418 as described above. The section of the radio button 420 further changes the function of the habitual "Ctrl+V" key to the level of detail of Paste as Plain Text 418. The change is displayed in the selection window 412 by presenting the shortcut key "Ctrl+V" as the shortcut 422 for the selected default. The other, non-selected, levels of detail may be assigned another non habitual key. Thus, the shortcut keys, including the habituated shortcut keys, may change dynamically with the user's default selection. This allows the user to retain their current habituated behavior but have some control over the function of the habituated behavior. In this example, the user retains the habituated behavior of the shortcut key "Ctrl+V", and selects the specific function that shortcut key provides. This allows the user to adjust the habituated behavior to the circumstances and workflow as desired. In this example, the paste as web preview level of detail is given the shortcut key of "Ctrl+Shift+X" and the paste as link level of detail is given the shortcut key of "Shift+Alt+V". These assignments are also reflected in the paste options menu 312.

The implementation in FIG. 4 showed the default selection of the level of detail Paste as Plain Text 418 by setting the radio button 420. In response, the habitual "Ctrl+V" key was changed to implement the associated paste function using the selected default level of detail of. Similarly, setting the default to other levels of detail changes the operation of the habitual shortcut key for the paste function to paste the corresponding selected default level of detail. For example, FIG. 3A shows an implementation where the default level of detail is Plain Text option 318 in the paste options menu 312. Since the Plain Text option 318 is the default level of detail, the habituated shortcut key "Ctrl+V" is currently assigned to this level of detail. If the user uses the "Ctrl+V" shortcut key the paste option will paste the plain text level of detail. The other levels of detail are shown with their assigned non-habituated shortcut keys. Similarly, FIG. 3B shows an implementation where the default level of detail is web preview option 314 in the paste options menu 312. Since the web preview option 314 is the default level of detail, the habituated shortcut key "Ctrl+V" is currently assigned to this level of detail. If the user uses the "Ctrl+V" shortcut key the paste option will paste the web preview level of detail. FIG. 3D shows an implementation where the default level of detail is Link option 354. Where the link option 354 is the default level of detail, the habituated shortcut key "Ctrl+V" is assigned to this level of detail. If the user uses the "Ctrl+V" shortcut key the paste option will paste the link level of detail.

Figure 5:
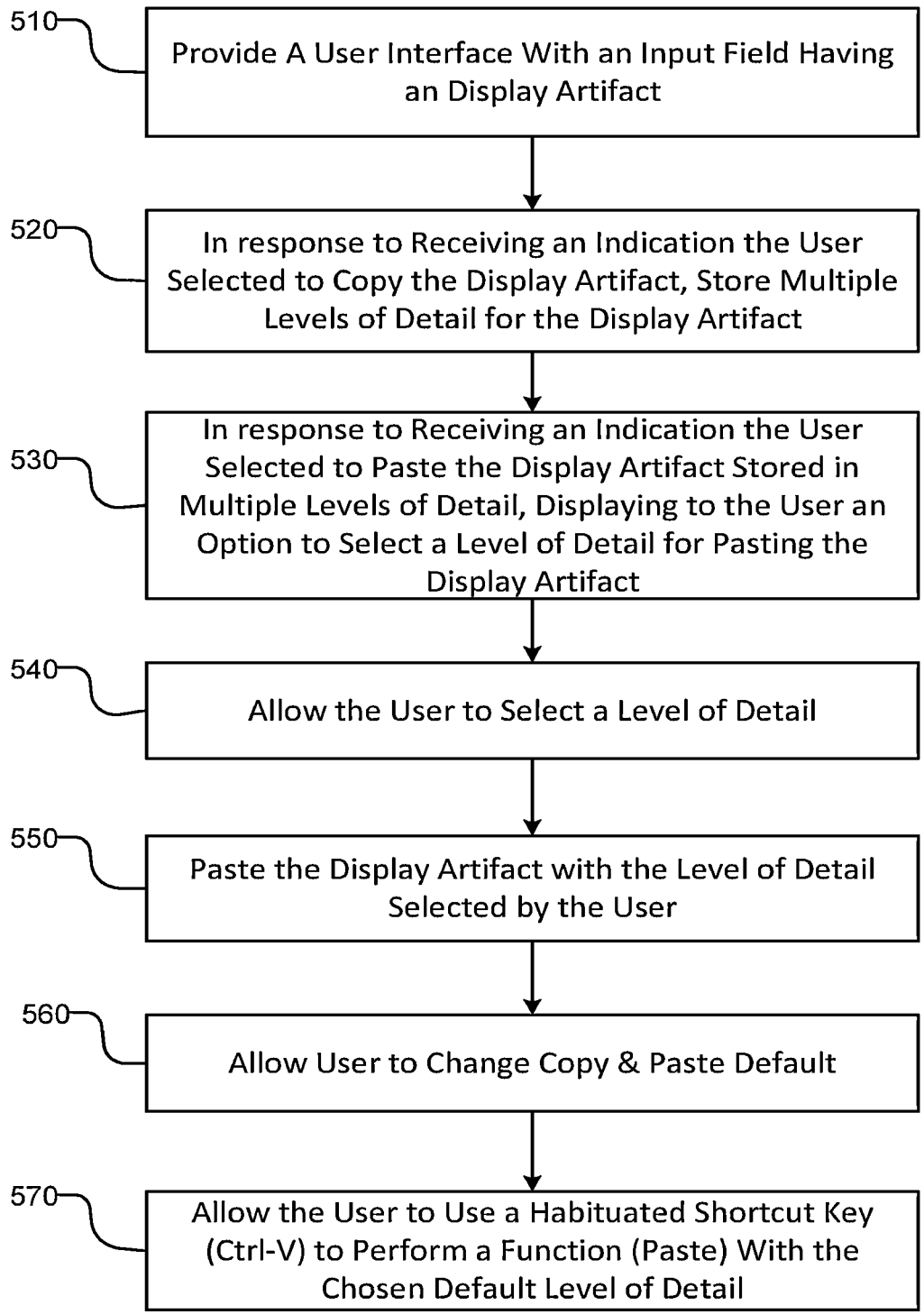
FIG. 5 is a flowchart of an implementation of a process for copying user interface artifacts with multiple levels of detail.

FIG. 5 is a flowchart of an implementation of a process for operating a device, such as the computer device 120 in FIG. 1, to provide a graphical user interface that allows a user to copy and paste display artifacts that include various levels of detail. At step 510, the device provides a user with a user interface with an input field having an input artifact. The user interface may be any software interface allowing a user to manipulate a display artifact. For example, the user interface may be a GUI for accessing web pages, an application, etc. The input field may be any input or output portion of the user interface that contains a display artifact. A display artifact may include any artifact that can be manipulated by the user. For example, the input artifact may be a URL, a hyperlink, formatted text, an image with styling, etc.

At step 520, the device stores multiple levels of detail for the display in response to receiving an indication a user selected to copy the artifact. The user may select to copy the display artifact by moving a pointer over the display artifact and executing a copy command with a mouse key, or other similar user input method to select a display artifact. The levels of detail for the display artifact may depend on the specific display artifact. For example, for a URL the levels of detail may include a web preview, link, and plain text. The levels of detail for and image may include the full image, the image metadata or other image information.

At step 530, in response to receiving an indication a user selected to paste the display artifact stored in multiple levels of detail, the device displays to the user an option to select a level of detail for pasting the display artifact. The displayed level of detail may be a static presentation or a dynamic preview of the display artifact.

At step 540, the device allows the user to select one of the levels of detail for the display artifact. The device may allow the user to make the selection using a pointer or other means to select one of the displayed static or dynamic levels of detail. Alternatively, the device may allow the user to make the selection using a shortcut key as described herein.

At step 550, the device pastes the display artifact with the level of detail selected by the user in step 540. The device will paste the display artifact at a location determined by the user. The location is typically determined by the location of the pointer when the user initiates the paste operation. The level of detail that the device can paste the display may be limited by the location. For example, if the location can not accept a higher level of detail the device will paste a lower level of detail that the destination can accommodate.

At step 560, the device allows the user to change the copy and paste default level of detail. For example, the device may present a pop-up screen or a settings page with a bullet button or other input to change the default level of detail. The selected default level of detail may then be associated with a habitual shortcut key as described herein. At step 570, the device may then allow the user to use the habituated shortcut key to perform the paste function with the chosen default level of detail.

Figure 6:
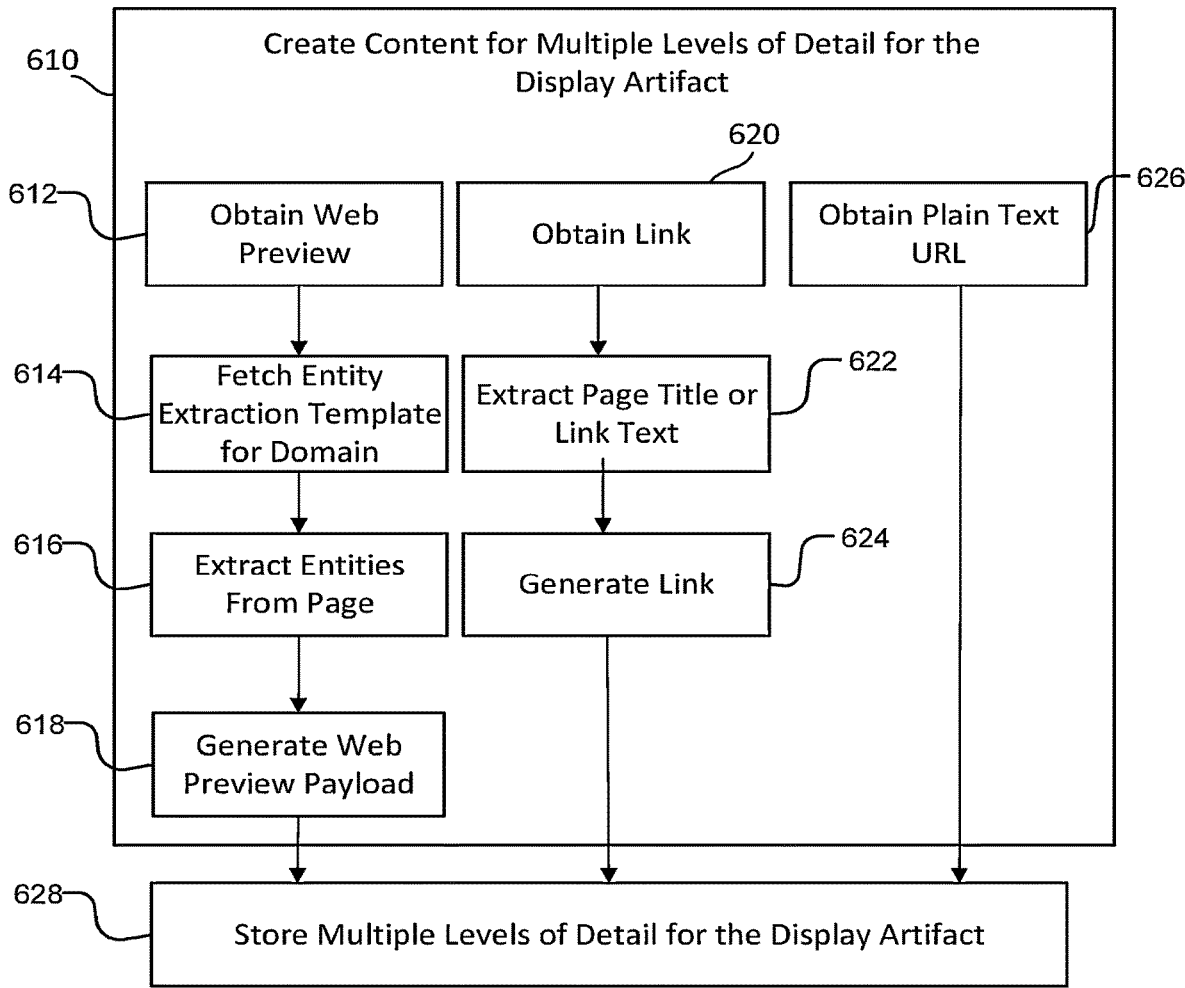
FIG. 6 is a flowchart of an implementation of a process for storing user interface artifacts with multiple levels of detail.

FIG. 6 is a flowchart of an implementation of a process for operating a device, such as computer device 120 in FIG. 1 to copy the display artifact and store multiple levels of detail for the display artifact. The flowchart in FIG. 6 is one possible implementation for step 520 in FIG. 5. At step 610, the device creates content for each of the multiple levels of detail for the display artifact, which is described further in steps 612-626.

At steps 612-618 the device creates content for the web preview level of detail. At step 612, the device obtains a copy of the web preview. At step 614, the device fetches an entity extraction template for the domain. At step 616, the device extracts entities from the web preview page. At step 618, the device generates a web preview payload.

At steps 620-624 the device creates content for the link level of detail. At step 620, the device obtains a copy of the link. At step 622, the device extracts the page title or link text. At step 624 the device generates a link.

At step 626 the device obtains the plain text URL to create content for the plain text level of detail. At step 628, the device stores multiple levels of detail for the display artifact. For the web preview level of detail, the device stores the generated web preview payload created in step 618. For the link level of detail, the device stores the link generated in step 624. And for the plain text URL level of detail, the device stores the plain text URL from step 626.

Figure 7A:
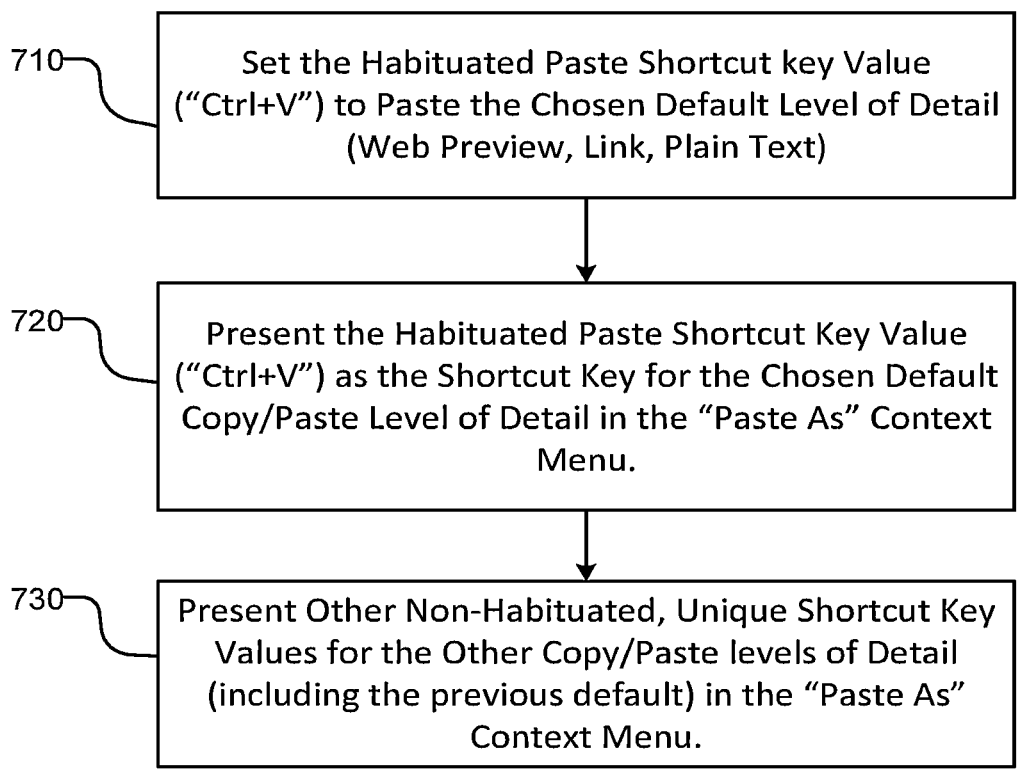
FIG. 7A is a flowchart of an implementation of a process for allowing a user to use a previously habituated shortcut key to perform a paste function with the chosen default level of detail.

FIG. 7A is a flowchart of an implementation of a process for operating a device, such as the computer device 120 in FIG. 1, to provide a graphical user interface that allows a user to use a habituated shortcut key to perform a paste function with the chosen default level of detail. The flowchart in FIG. 7A is one possible implementation for step 570 in FIG. 5. At step 710, set the previously habituated paste shortcut key value ("Ctrl+V") to paste the chosen default copy/paste level of detail (Web Preview, Link, Plain Text). At step 720, present the habituated paste shortcut key value ("Ctrl+V") as the shortcut key for the chosen default Copy/Paste level of detail in the "Paste As" context menu. At step 730, present other, non-habituated and unique shortcut key values for the other Copy/Paste levels of detail (including the previous default) in the "Paste As" context menu.

Figure 7B:
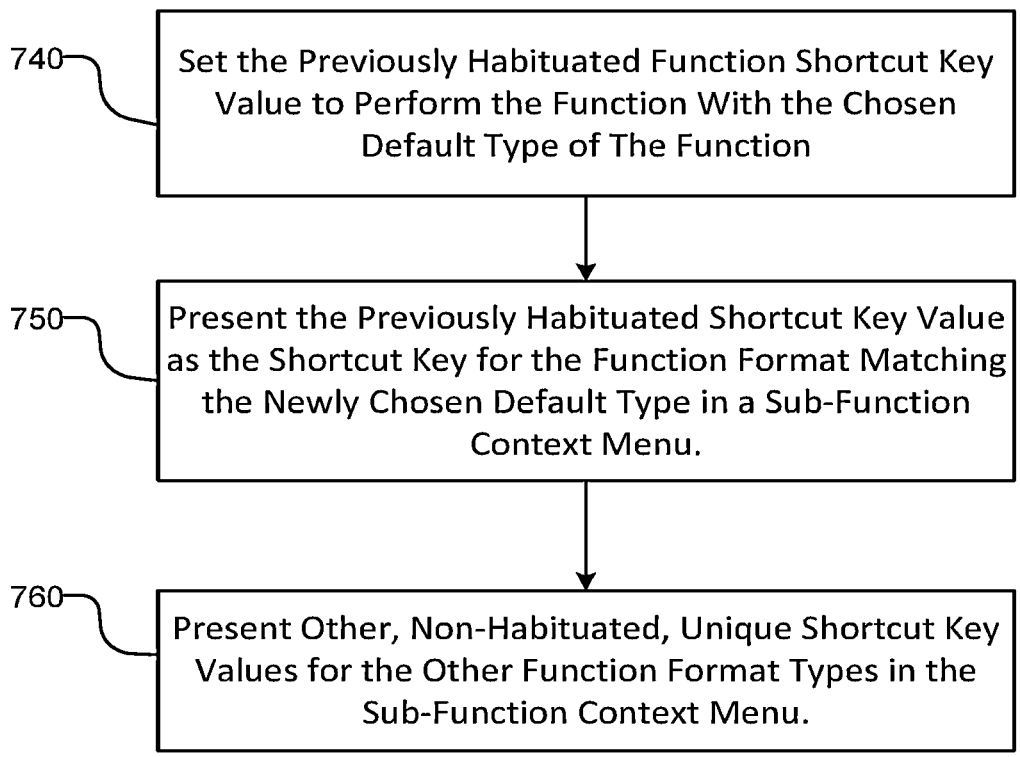
FIG. 7B is a flowchart of an implementation for allowing a user to use a previously habituated shortcut key to perform a function with the chosen default level of detail.

FIG. 7B is a flowchart of an implementation of a process for operating a device, such as the computer device 120 in FIG. 1, to provide a graphical user interface that allows a user to use a habituated shortcut key to perform a general function with a chosen default type of the function (such as level of detail). FIG. 7B is thus similar to FIG. 7A. However, FIG. 7B shows a generalized flow for other functions such as those described below. The flowchart in FIG. 7B is another possible implementation for step 570 in FIG. 5. First, set the previously habituated shortcut key value to perform the function with the chosen default type of the function (step 740). Then, present the habituated paste shortcut key value as the shortcut key value for the function format matching the chosen default function type in a sub-function context menu (similar to the "paste as" context menu) (step 750). Finally, present other, non-habituated and unique shortcut key values for the other function format types in the sub-function context menu (step 760).

Other functions could also implement a previously habituated shortcut key to perform a general function with a chosen default type of the function as described above. For example, "Alt+Tab" could swap with Windows "Key+Tab" to give a greater level of detail to task switching. This implementation and the implementations described herein could offer the user a setting to swap back to the previous level of detail. The "Ctrl+Space" shortcut key typically clears formatting in many applications. The "Ctrl+Space" could be changed to auto-generate formatting based on ML understanding the context of the selected content, with a new shortcut key created to clear formatting. The "Ctrl+Alt+Delete" shortcut key could be used to auto-troubleshoot a problem instead of bringing up a manual menu of troubleshooting tools, while a new shortcut key could bring up the current "Ctrl+Alt+Delete" behavior.

Figure 8:
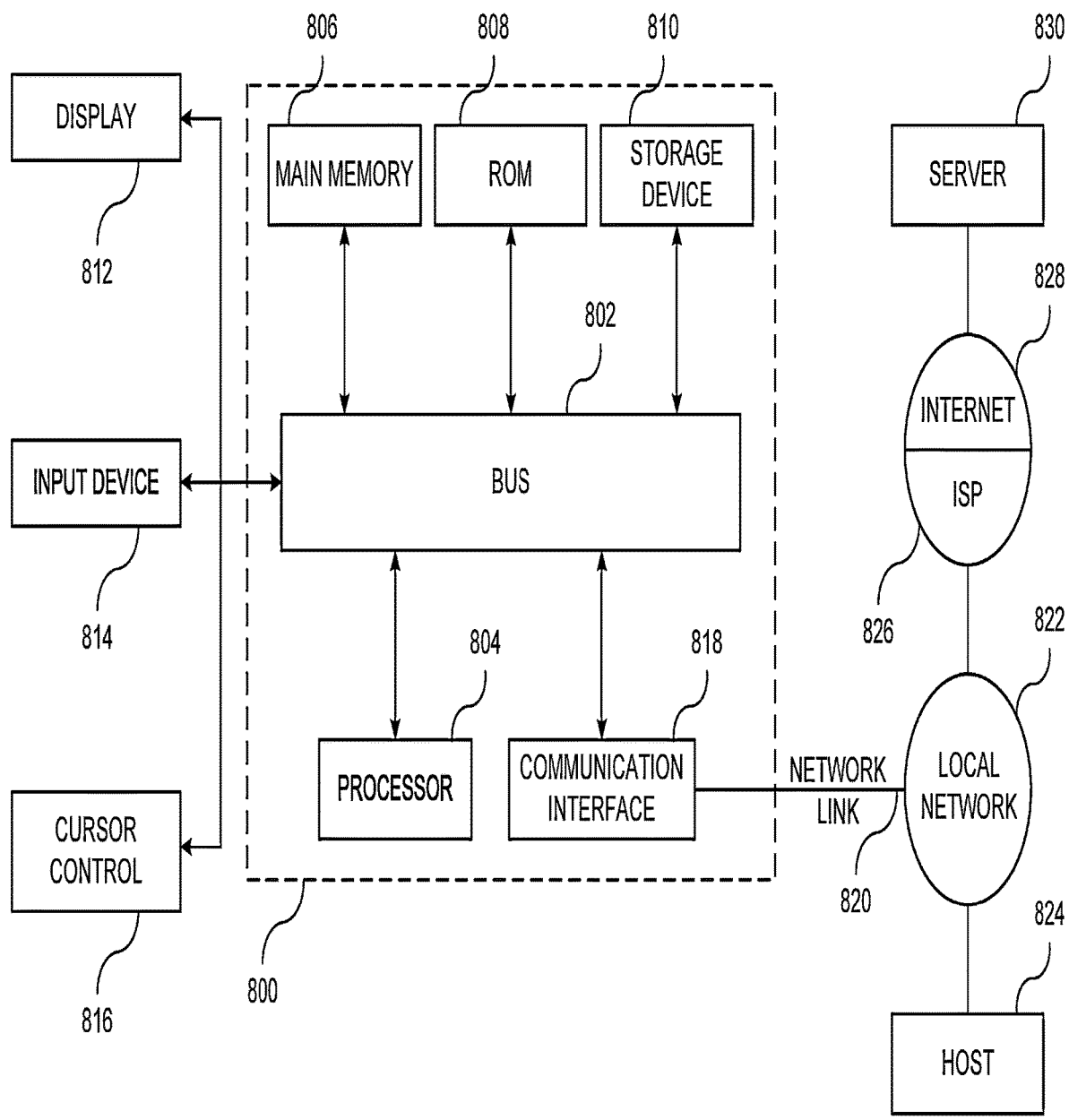
FIG. 8 is a block diagram showing an example computer system upon which various implementations of this disclosure may be implemented.

FIG. 8 is a block diagram showing an example a computer system 800 upon which various implementations of this disclosure may be implemented. The computer system 800 may include a bus 802 or other communication mechanism for communicating information, and a processor 804 coupled with the bus 802 for processing information. The computer system 800 may also include a main memory 806, such as a random-access memory (RAM) or other dynamic storage device, coupled to the bus 802 for storing information and instructions to be executed by the processor 804. The main memory 806 may also be used for storing temporary variables or other intermediate information during execution of instructions to be executed by the processor 804.

The computer system 800 may further include a read only memory (ROM) 808 or other static storage device coupled to the bus 802 for storing static information and instructions for the processor 804. A storage device 810, such as a flash or other non-volatile memory may be coupled to the bus 802 for storing information and instructions.

The computer system 800 may be coupled via the bus 802 to a display 812, such as a liquid crystal display (LCD), for displaying information. One or more user input devices, such as the example user input device 814 may be coupled to the bus 802, and may be configured for receiving various user inputs, such as user command selections and communicating these to the processor 804, or to the main memory 806. The user input device 814 may include a physical structure, or virtual implementation, or both, providing user input modes or options such as a keyboard. Further, cursor control 816 may include a physical structure, or virtual implementation, or both, for controlling, for example, a cursor or pointer, visible to a user through display 812 or through other techniques, and such modes or operations may include, for example virtual mouse, trackball, or cursor direction keys.

The computer system 800 may include respective resources of the processor 804 executing, in an overlapping or interleaved manner, respective program instructions. Instructions may be read into the main memory 806 from another machine-readable medium, such as the storage device 810. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 810. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine.

The computer system 800 may also include a communication interface 818 coupled to the bus 802, for two-way data communication coupling to a network link 820 connected to a local network 822. The network link 820 may provide data communication through one or more networks to other data devices. For example, the network link 820 may provide a connection through the local network 822 to a host computer 824 or to data equipment operated by an Internet Service Provider (ISP) 826 to access through the Internet 828 a server 830, for example, to obtain code for an application program or an interne web page.

As used herein, "computer-readable" medium" refers to a device, such as storage device 810, able to temporarily or permanently store instructions and data that cause computer system or machine 800 to operate in a specific fashion. The term "computer-readable medium," as used herein, does not encompass transitory electrical or electromagnetic signals per se (such as on a carrier wave propagating through a medium); the term "computer-readable medium" may therefore be considered tangible and non-transitory. Non-limiting examples of a non-transitory, tangible computer-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "computer-readable medium" applies to a single medium, or combination of multiple media, used to store instructions for execution by a computer system 800 such that the instructions, when executed by one or more processors 804, cause the system to perform and one or more of the features described herein. Accordingly, a "computer-readable medium" may refer to a single storage device, as well as "cloud-based" storage systems or storage networks that include multiple storage apparatus or devices.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A device comprising:
   a processor; and
   a memory in communication with the processor, the memory comprising executable instructions that, when executed by the processor, cause the processor to control the device to perform functions of:
      providing a user interface with a display artifact;
      receiving a selection to copy the display artifact;
      in response to receiving the selection to copy the display artifact, storing multiple levels of detail of the display artifact;
      presenting a plurality of paste options for pasting the display artifact, wherein the plurality of paste options each have a unique level of detail for representing the display artifact;
      receiving a selection of a paste option from the plurality of paste options;
      in response to receiving the selection of the paste option, assigning a habituated shortcut key to the selected paste option;
      receiving an entry of the habituated shortcut key; and
      in response to the entry of the habituated shortcut key, pasting the display artifact with a level of detail associated with the selected paste option.

2. The device of claim 1, wherein the functions further comprise, displaying, concurrently with the plurality of paste options, a visual representation for each level of detail of the display artifact.

3. The device of claim 2, wherein displaying the visual representation for each level of detail includes displaying a live preview of the display artifact.

4. The device of claim 1, wherein presenting the paste options for each level of detail includes displaying only paste options having corresponding levels of detail supported by a selected input field.

5. The device of claim 1, wherein the display artifact is a uniform resource locator.

6. The device of claim 1, wherein the functions further comprise:
   in response to receiving the selection of the paste option, assigning a non-habituated shortcut key to an unselected paste option.

7. The device of claim 6, wherein the functions further comprise:
   receiving an entry of the non-habituated shortcut key; and
   in response to the entry of the habituated shortcut key, pasting the display artifact with a level of detail associated with the unselected paste option.

8. The device of claim 1, wherein the habituated shortcut key is Ctrl+V.

9. The device of claim 1, wherein storing multiple levels of detail of the display artifact further comprises creating content for a web preview level of detail by:
   obtaining a copy of a web preview;
   fetching an entity extraction template for a domain;
   extracting entities from the web preview; and
   generating a web preview payload.

10. A computer-implemented method, comprising:
    receiving a selection to copy a display artifact;
    in response to receiving the selection to copy the display artifact, storing multiple levels of detail of the display artifact;
    presenting a plurality of paste options for pasting the display artifact, wherein the plurality of paste options each have a unique level of detail for representing the display artifact;
    receiving a selection of a paste option from the plurality of paste options;
    in response to receiving the selection of the paste option, assigning a habituated shortcut key to the selected paste option;
    receiving an entry of the habituated shortcut key; and
    in response to the entry of the habituated shortcut key, pasting the display artifact with a level of detail associated with the selected paste option.

11. The method of claim 10, further comprising displaying, concurrently with the plurality of paste options, a visual representation for each level of detail of the display artifact.

12. The method of claim 11, wherein displaying the visual representation for each level of detail includes displaying a live preview of the display artifact.

13. The method of claim 10, wherein the display artifact is a uniform resource locator.

14. The method of claim 10, further comprising, in response to receiving the selection of the paste option, assigning a non-habituated shortcut key to an unselected paste option.

15. The method of claim 14, further comprising:
receiving an entry of the non-habituated shortcut key; and
in response to the entry of the habituated shortcut key, pasting the display artifact with a level of detail associated with the unselected paste option.

16. The method of claim 15, wherein the non-habituated shortcut key is a key other than Ctrl+V.

17. The method of claim 10, wherein storing multiple levels of detail of the display artifact further comprises creating content for a web preview level of detail by:
obtaining a copy of a web preview;
fetching an entity extraction template for a domain;
extracting entities from the web preview; and
generating a web preview payload.

18. A computer-implemented method comprising:
receiving a selection to copy a display artifact;
in response to receiving the selection to copy the display artifact, storing multiple levels of detail of the display artifact;
presenting a plurality of paste options for pasting the display artifact, wherein the plurality of paste options include:
a first paste option corresponding to a first level of detail representing the display artifact;
a second paste option corresponding to a second level of detail representing the display artifact;
a third paste option corresponding to a third level of detail representing the display artifact;
receiving a selection of the first paste option;
in response to receiving the selection of the paste option, assigning a habituated shortcut key to the first paste option;
receiving an entry of the habituated shortcut key; and
in response to the entry of the habituated shortcut key, pasting the display artifact with the first level of detail.

19. The method of claim 18, further comprising, in response to receiving the selection of the paste option:
assigning a first non-habituated shortcut key to the second paste option; and
assigning a second non-habituated shortcut key to the third paste option.

20. The method of claim 19, further comprising:
receiving an entry of the second non-habituated shortcut key; and
in response to the entry of the second non-habituated shortcut key, pasting the display artifact with the third level of detail.

* * * * *